(12) United States Patent
Freymueller (10) Patent No.: US 10,807,225 B2
(45) Date of Patent: Oct. 20, 2020

(54) HANDHELD WORK APPARATUS AND METHOD FOR MOUNTING AN ANTI-VIBRATION UNIT THEREOF

(71) Applicant: Andreas Stihl AG & Co. KG, Waiblingen (DE)

(72) Inventor: Carsten Freymueller, Weinstadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/513,347

(22) Filed: Jul. 16, 2019

(65) Prior Publication Data

US 2020/0030959 A1    Jan. 30, 2020

(30) Foreign Application Priority Data

Jul. 25, 2018  (EP) .................................... 18185518

(51) Int. Cl.
*B25G 1/01*        (2006.01)
*B25F 5/00*        (2006.01)
(Continued)

(52) U.S. Cl.
CPC .............. *B25F 5/006* (2013.01); *F16F 1/125* (2013.01); *F16F 15/067* (2013.01); *A01G 3/086* (2013.01);
(Continued)

(58) Field of Classification Search
CPC ... Y10T 16/469; Y10T 16/4713; A01B 1/026; B25F 5/006; B25F 5/02; B25F 5/025;
(Continued)

(56) References Cited

U.S. PATENT DOCUMENTS 4,141,143 A * 2/1979 Hirschkoff ................ F16F 3/10
                                                                30/381
5,090,657 A * 2/1992 Dreiman ............... F16F 15/067
                                                                248/624
(Continued)

FOREIGN PATENT DOCUMENTS

CN          204136026 U    2/2015
EP          2436263 A2     4/2012
(Continued)

*Primary Examiner* — Chuck Y Mah
(74) *Attorney, Agent, or Firm* — Walter Ottesen, P.A.

(57) ABSTRACT

A handheld work apparatus includes a first assembly, a second assembly and an anti-vibration unit which includes a coil spring. A first end of the coil spring forms a fastening eyelet fixed to the first assembly by an attachment screw which extends through the fastening eyelet and the head thereof projects into the coil spring. A second end of the coil spring is screwed onto a connecting piece of the second assembly which has an opening extending through the connecting piece and through which an engagement contour in the head of the attachment screw is accessible for a tool. When the work apparatus is in a non-loaded state, the distance (f) between the fastening eyelet and a front end of the connecting piece is ≤the length (g) of the attachment screw. The distance (p) of the above support surface from the front end of the connecting piece is the length (g).

13 Claims, 3 Drawing Sheets

(51) Int. Cl.
  *F16F 1/12* (2006.01)
  *F16F 15/067* (2006.01)
  *A01G 3/08* (2006.01)
  *B27B 17/00* (2006.01)
(52) U.S. Cl.
  CPC ....... *B27B 17/0008* (2013.01); *B27B 17/0033* (2013.01)
(58) Field of Classification Search
  CPC ......... B25F 5/026; B25B 13/52; B25D 17/04; B25D 17/043; B23B 45/001; B25G 1/002; B25G 1/005; B25G 1/102; B25G 1/10; B25G 3/00; B25G 3/02; B25G 3/18; B25G 3/20; B25G 3/24; B25G 3/26; B25G 3/28; B25G 3/30; F16F 1/125; F16F 15/067; A01G 3/086; B27B 17/0008; B27B 17/0033
  See application file for complete search history.

(56) References Cited

U.S. PATENT DOCUMENTS

| | | | | |
|---|---|---|---|---|
| 5,361,500 | A * | 11/1994 | Naslund | B27B 17/0033 30/381 |
| 5,368,107 | A * | 11/1994 | Taomo | B25F 5/006 173/162.2 |
| 5,697,465 | A * | 12/1997 | Kruse | A61G 5/042 180/65.1 |
| 6,643,939 | B2 * | 11/2003 | Tajima | B27B 17/0033 173/162.2 |
| 6,994,068 | B2 * | 2/2006 | Menzel | F02B 63/02 123/192.1 |
| 7,357,380 | B2 * | 4/2008 | Menzel | B23D 47/005 188/378 |
| 7,412,959 | B2 * | 8/2008 | Wolf | B27B 17/0033 123/198 E |
| 7,942,212 | B2 * | 5/2011 | Zimmermann | B25F 5/006 173/162.1 |
| 8,225,514 | B2 * | 7/2012 | Guip | B27B 17/0033 30/381 |
| 8,511,658 | B2 * | 8/2013 | Moessnang | B25D 17/043 267/174 |
| 9,623,547 | B2 * | 4/2017 | Kurzenberger | B23Q 11/0032 |
| 9,975,235 | B2 * | 5/2018 | Notaras | B25F 5/006 |
| 2002/0104665 | A1 * | 8/2002 | Wolf | B25F 5/006 173/162.2 |
| 2004/0016133 | A1 | 1/2004 | Gorenflo et al. | |
| 2011/0240324 | A1 * | 10/2011 | Kondo | B23D 47/005 173/162.2 |
| 2012/0073144 | A1 | 3/2012 | Tamura et al. | |
| 2016/0176037 | A1 * | 6/2016 | Hirai | B25F 5/006 173/162.2 |

FOREIGN PATENT DOCUMENTS

| | | |
|---|---|---|
| JP | 2002038977 A | 2/2002 |
| JP | 2005090536 A | 4/2005 |
| JP | 2006042724 A | 2/2006 |
| JP | 2011177798 A | 9/2011 |
| JP | 2011182682 A | 9/2011 |
| JP | 2011201000 A | 10/2011 |
| JP | 2013021979 A | 2/2013 |
| JP | 2013031931 A | 2/2013 |
| JP | 2014148005 A | 8/2014 |
| WO | 2010116781 A1 | 10/2010 |

* cited by examiner

HANDHELD WORK APPARATUS AND METHOD FOR MOUNTING AN ANTI-VIBRATION UNIT THEREOF

CROSS REFERENCE TO RELATED APPLICATION

This application claims priority of European patent application no. 18 185 518.0, filed Jul. 25, 2018, the entire content of which is incorporated herein by reference.

FIELD OF THE INVENTION

The invention relates to a handheld work apparatus, and to a method for mounting an anti-vibration unit of the handheld work apparatus.

BACKGROUND OF THE INVENTION

Known from JP 2006-042724 A is a handheld work apparatus, namely, a hedge trimmer, which has a drive motor and a handgrip unit. The drive motor is decoupled from the handgrip unit with respect to vibration via anti-vibration units. The anti-vibration units have coil springs, which are each fixed to the motor unit by means of a screw. The other end of the coil spring is screwed into a connecting piece that is connected to the handgrip assembly. The attachment screw can be accessed through an opening for the purpose of fixing the coil screw to the motor assembly. The screw can also be pushed into the coil spring through this opening for the purpose of mounting.

SUMMARY OF THE INVENTION

It is an object of the invention to provide a handheld work apparatus, of the generic type, that enables simple mounting with a simple structure. A further object of the invention is to provide a method for mounting an anti-vibration unit of a handheld work apparatus.

This object is achieved by a handheld work apparatus comprising a first assembly, a second assembly and at least one anti-vibration unit, wherein the anti-vibration unit includes a coil spring, wherein a first end of the coil spring forms a fastening eyelet, at which the coil spring has a reduced outer diameter, wherein the first end of the coil spring is fixed to the first assembly by an attachment screw, wherein the attachment screw extends through the fastening eyelet, and the head projects into the inside of the coil spring, wherein the fastening eyelet bears with a support surface against the first assembly, and wherein a second end of the coil spring is screwed onto a connecting piece of the second assembly, wherein the connecting piece projects into the inside of the coil spring and has a front end arranged inside the coil spring, wherein the head of the attachment screw has an engagement contour, wherein the second assembly has an opening, which extends through the connecting piece and through which the engagement contour in the head of the attachment screw is accessible for a tool, wherein, when the work apparatus is in a non-loaded state, the distance between the fastening eyelet and the front end of the connecting piece is less than or equal to the length of the attachment screw, and the distance of the support surface of the fastening eyelet from the front end of the connecting piece is greater than or equal to the length of the attachment screw.

With respect to the method, the object is achieved by a method for mounting an anti-vibration unit of a handheld work apparatus comprising a first assembly, a second assembly and at least one anti-vibration unit, wherein the anti-vibration unit includes a coil spring, wherein a first end of the coil spring forms a fastening eyelet, at which the coil spring has a reduced outer diameter, wherein the first end of the coil spring is fixed to the first assembly by an attachment screw, wherein the attachment screw extends through the fastening eyelet, and the head projects into the inside of the coil spring, wherein the fastening eyelet bears with a support surface against the first assembly, and wherein a second end of the coil spring is screwed onto a connecting piece of the second assembly, wherein the connecting piece projects into the inside of the coil spring and has a front end arranged inside the coil spring, wherein the head of the attachment screw has an engagement contour, wherein the second assembly has an opening, which extends through the connecting piece and through which the engagement contour in the head of the attachment screw is accessible for a tool, wherein, when the work apparatus is in a non-loaded state, the distance between the fastening eyelet and the front end of the connecting piece is less than or equal to the length of the attachment screw, and the distance of the support surface of the fastening eyelet from the front end of the connecting piece is greater than or equal to the length of the attachment screw, wherein, in a first step, the head of the attachment screw is arranged in the coil spring, wherein, in a second step, the coil spring is screwed with its second end onto the connecting piece, and wherein, in a third step, the attachment screw is screwed into the first assembly.

The head of the attachment screw of the coil spring has an engagement contour for a tool. The engagement contour is accessible through an opening in a connecting piece of the second assembly. The connecting piece has a front end arranged inside the coil spring. When the work apparatus is in a non-loaded state, the distance between the fastening eyelet and the front end of the connecting piece is less than or equal to the length of the attachment screw. The end of the attachment screw is thereby secured in the fastening eyelet, such that the length of the attachment screw is predetermined. Mounting is thereby simplified. The distance of a support surface of the fastening eyelet, configured to bear against the first assembly, from the front end of the connecting piece is greater than or equal to the length of the attachment screw. As a result, when the head of the attachment screw bears against the front end of the connecting piece, the free end thereof lies within the fastening eyelet. Thus, when the second assembly is being mounted on the first assembly, the end of the attachment screw does not project over the fastening eyelet if the first assembly is arranged such that the attachment screw bears against the connecting piece, and does not impede arranging of the second assembly on the first assembly. As a result of the specified matching of the distances to the length of the attachment screw, during mounting of the assemblies the attachment screw is reliably positioned in the coil spring until the attachment screw is fixed to the first assembly, through the opening in the connecting piece.

Advantageously, the inner diameter of the opening is not more than 110% of the outer diameter of the head of the attachment screw. Consequently, once the second end of the coil spring has been screwed onto the connecting piece, the attachment screw can no longer fall out of the inside of the coil spring. Owing to the length of the head of the screw, the screw head tilts in the opening when it comes into the region of the opening, and cannot accidentally come out of the inside of the coil spring. Preferably, the inner diameter of the opening is not more than 105% of the outer diameter of the head of the attachment screw. Advantageously, the inner diameter of the opening is less than the outer diameter of the head of the attachment screw. The attachment screw can be arranged and positioned inside the coil spring before the coil spring is mounted on the connecting piece. After having been screwed onto the connecting piece, the attachment screw is then already pre-positioned, and then only has to be fixed to the first assembly. Mounting of the anti-vibration unit of the work apparatus is thereby simplified. Advantageously, only two screw connection operations are required for mounting the anti-vibration unit, namely, screwing the second end of the coil spring onto the connecting piece, and screwing-in the attachment screw on the first assembly. No further screw connection operations are necessary.

Since the coil spring itself holds the attachment screw on the second assembly, loss of the attachment screw during mounting, or in the case of unintentional slackening of the attachment screw, is avoided as soon as the second end of the coil spring has been screwed onto a connecting piece of the second assembly. The attachment screw can therefore be pre-mounted, with the coil spring, on the second assembly, and only subsequently fixed to the first assembly. Between the fixing of the first end of the coil spring and of the second end of the coil spring, there may be further mounting steps, for assembling the work apparatus, during which the second assembly may be positioned and rotated in any manner, without the attachment screw being able to fall out of the coil spring. Assembly of the work apparatus is thereby simplified considerably, and can be performed more flexibly.

The expression "engagement contour" in the present case denotes the region of the attachment screw at which a tool and the screw are in engagement with each other. The fastening contour is preferably a hexagon socket, a slot, a cross slot, or a Torx. However, the engagement contour may also be of a different configuration, and may also be provided, for example, on the outer circumference of the head of the attachment screw.

Advantageously, one of the two assemblies comprises at least one handle, and the other of the two assemblies comprises a drive motor. The connecting piece is preferably realized so as to be integral with a housing part of the second assembly. The term "housing part" in this case is to be understood in a wide sense, and may also denote, for example, a frame or the like. In an alternative, advantageous configuration, the connecting piece may also be realized so as to be integral with a component part, in particular a housing part, of the first assembly. A further mounting step, by which the connecting piece must be fixed to a housing part of the first or second assembly, can consequently be omitted. The housing part that is realized so as to be integral with the connecting piece forms, in particular, at least one handle. Preferably, the housing part is a handgrip housing, which forms one or more handles of the work apparatus, and on which the connecting piece is integrally realized. The handgrip housing may be realized, in particular, as a handgrip frame.

Advantageously, the first assembly has an anti-rotation safeguard, which secures the fastening eyelet of the coil spring against rotating about the longitudinal center axis of the coil spring. It is thereby ensured that the coil spring does not rotate relative to the second assembly as the attachment screw is being tightened. Depending on the coil direction of the spring, partial unscrewing from the connecting piece or tensioning of the spring can thereby be avoided. A simple configuration of the anti-rotation safeguard is achieved if the fastening eyelet has a non-round outer contour, and the first assembly secures the fastening eyelet, at its non-round outer contour, against rotating about the longitudinal center axis of the coil spring. Particularly preferably, the fastening eyelet has a region in which the distance of the wire of the coil spring from the longitudinal center axis of the coil spring increases in the direction of the end of the coil wire.

Advantageously, the fastening eyelet is arranged, at least partially, in a depression of the first assembly. The positioning of the fastening eyelet on the first assembly during mounting is thereby facilitated. Particularly preferably, at least one wall that delimits the depression forms an anti-rotation safeguard for the fastening eyelet, against rotating about the longitudinal center axis of the coil spring. Consequently, no additional components or units are required to realize the anti-rotation safeguard.

Preferably, the fastening eyelet forms a flat support surface for supporting on the assembly. Particularly preferably, the portion of the coil wire of the coil spring that forms the fastening eyelet is wound, at the end of the coil spring, in a plane that is perpendicular to the longitudinal center axis, and thereby forms the flat support surface. In an alternative configuration, the coil spring may also be ground flat in the region of the fastening eyelet.

Advantageously, the inner diameter of the fastening eyelet is less than the outer diameter of the head of the attachment screw. As a result, the attachment screw cannot go through the fastening eyelet, out from the inside of the coil spring. In a particular preferred configuration, the connecting piece projects into the inside of the coil spring. A reduced structural space requirement is thereby achieved, in comparison with a connecting piece arranged on the outer circumference of the coil spring. In an alternative configuration, the connecting piece may also be arranged on the outer circumference of the coil spring, and the coil spring may be screwed into an internal thread of the connecting piece.

The connecting piece advantageously has a thread section, at which the coil spring is held. The thread section has, in particular, a groove, into which the coil spring is screwed. The connecting piece advantageously has a sleeve section, which has a distance from the coil spring in the radial direction. The front end of the connecting piece is advantageously realized on the sleeve section. By matching of the length of the sleeve section to the length of the attachment screw, it can be ensured that, when the attachment screw has been slackened, the attachment screw is prevented by the front end of the connecting piece from slipping out of the fastening eyelet. Matching of the length of the sleeve section can be effected without affecting the spring properties of the coil spring.

Preferably, the work apparatus has at least two anti-vibration units having a coil spring. It is provided that all connecting pieces of the at least two anti-vibration units, at which in each case a second end of the coil springs is screwed-in, are arranged on the second assembly, and all engagement contours of the attachment screws are accessible from the same side of the work apparatus. Accordingly, all anti-vibration units having a coil spring are to be mounted from the same side of the work apparatus. In particular, there is consequently no need to change the position of the work apparatus in order to tighten the attachment screws. The longitudinal center axes of all coil springs of the work apparatus are preferably approximately parallel. The angular distance between the longitudinal center axes of the coil springs of all anti-vibration units is advantageously less than 5°.

A method for mounting an anti-vibration unit of a handheld work apparatus provides that, in a first step, the head of the attachment screw is arranged in the coil spring, that in a subsequent, second step, the coil spring is screwed in, with its second end, on a connecting piece of the second assembly, and that in a subsequent, third step, the attachment screw is screwed into the first assembly. In particular, further mounting steps, for assembling the work apparatus, which are independent of the mounting of the anti-vibration unit, may be effected between the second step and the third step. The second mounting step advantageously directly follows the first mounting step, such that the attachment screw, directly after having been arranged in the coil spring, is secured in the coil spring by the screwing of the coil spring onto the connecting piece.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
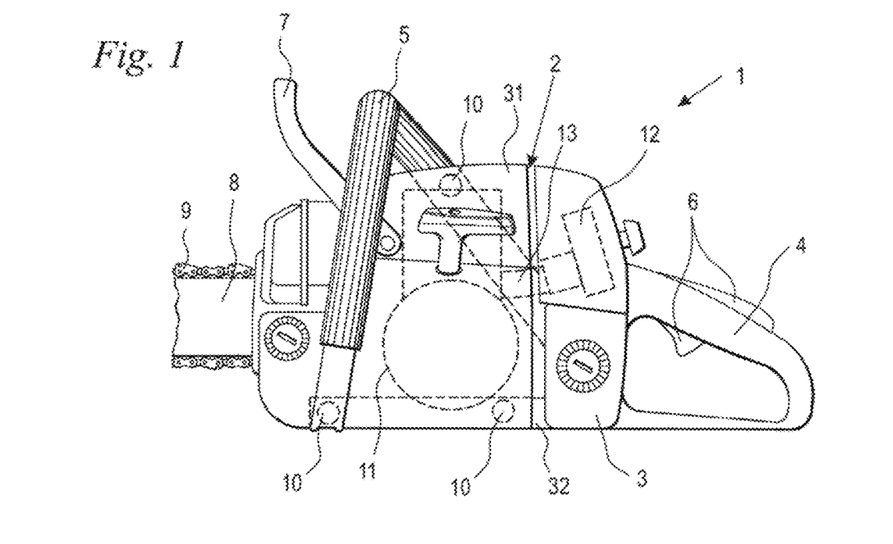
FIG. 1 is a schematic of a handheld work apparatus.

Shown schematically in FIG. 1 is a handheld work apparatus 1, which in the embodiment is a chain saw. The handheld work apparatus may also be another work apparatus such as, for example, an abrasive-disk cutter, a brushcutter, a hedge trimmer, a lawnmower, or the like. The work apparatus 1 has a drive motor 11, which serves to drive a tool, namely a saw chain 9. The saw chain 9 is arranged so as to revolve on a guide bar 8. Handles 4 and 5 serve to guide the work apparatus 1 during operation. The handle 4 is realized as a rear handle, and has operator-controlled elements 6, for example a throttle lever and a throttle-lever lock. The handle 5 is realized as a bale handle. The work apparatus 1 additionally has a hand protector 7, which extends between the handle 5 and the guide bar 9. The hand protector 7 may serve to trigger a braking device, not shown, for the saw chain 9.

A first assembly 31 of the work apparatus 1 comprises the drive motor 11 and the tool, which in the embodiment is realized as a guide bar 8 having the saw chain 9. The handles 4 and 5 are part of a second assembly 32 of the work apparatus 1.

In the embodiment, the second assembly 32 is a handgrip housing, on which an operating fluid tank 3, in particular a fuel tank, may be integrated. It may also be provided that the first assembly 31 comprises the operating fluid tank 3.

When the work apparatus 1 is in operation, vibrations are produced, in particular by the tool and/or the drive motor 11. In order for the transmission of the vibrations, generated at the first assembly 31, to the second assembly 32 to be kept at a low level, there is a vibration gap 2, which allows relative movements of the first assembly 31 with respect to the second assembly 32, arranged between the assemblies 31 and 32. The vibration gap 2 is bridged by anti-vibration units 10. In the embodiment, three anti-vibration units 10 are represented, the structure of which is described in yet greater detail in the following. Further anti-vibration units and/or anti-vibration units having a different structure may additionally be provided.

In the embodiment, the drive motor 11 is an internal combustion engine. Arranged on the second assembly 32 is an air filter 12, via which combustion air for the drive motor 11 is taken in. The air filter 12 is connected to the drive motor 11 via an intake channel 13. In the embodiment, the intake channel 13 bridges the vibration gap 2. A different arrangement of the air filter 12 may also be advantageous.

Figure 2:
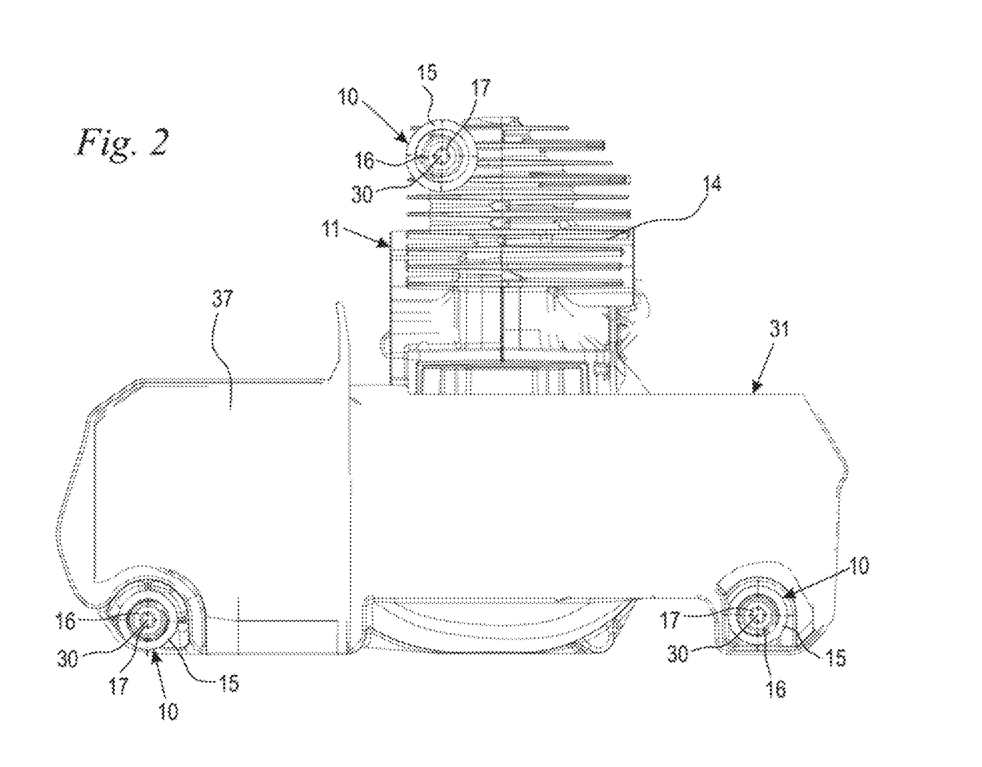
FIG. 2 is a first assembly of the work apparatus from FIG. 1, in a schematic side view, with coil springs of anti-vibration units arranged thereon.

A part of the first assembly 31 is shown schematically in FIG. 2. The first assembly 31 comprises an engine mount 37, on which the drive motor 11 is held. It may be provided that parts of the drive motor 11, for example a crankcase of the drive motor 11, are realized so as to be integral with the engine mount 37. There are two anti-vibration units 10 held on the engine mount 37. Represented in FIG. 2 are, respectively, one coil spring 15 and one attachment screw 16 of each anti-vibration unit 10. As shown by FIG. 2, the attachment screws each have an engagement contour 17, which in the embodiment is a Torx contour for engagement of a tool.

In the embodiment, the drive motor 11 has a cylinder 14, on which a third anti-vibration unit 10 is held. Of the third anti-vibration unit 10, also, the coil spring 15 and the attachment screw 16, having the engagement contour 17, are represented. The anti-vibration units 10 have longitudinal center axes 30, which correspond to the center axis of the coil springs 15. As shown by FIG. 2, in the embodiment the longitudinal center axes 30 are parallel to each other. Advantageously, the angle between the longitudinal center axes 30 of the anti-vibration units 10 is not more than 5°.

Figure 3:
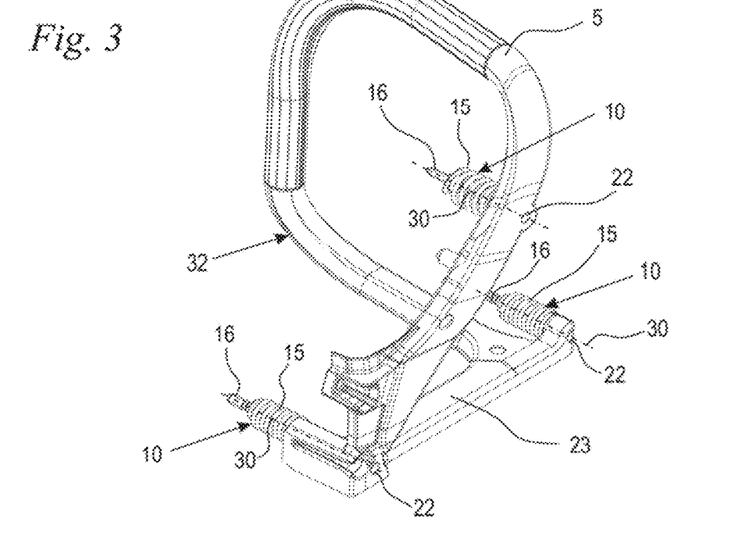
FIG. 3 is a second assembly of the work apparatus with anti-vibration units arranged thereon.

FIG. 3 shows the second assembly 32 with anti-vibration units 10 arranged thereon, in a perspective representation. The second assembly 32 comprises the bale handle 5, and a connecting section 23, which connects the two ends of the bale handle 5 to each other. The engagement contours 17 (FIG. 2), not shown in FIG. 3, of the attachment screws 16 are accessible through openings 22 of the second assembly 32. In the embodiment, the bale handle 5 is realized so as to be integral with the connecting section 23. Advantageously, the bale handle 5 is produced from plastic, in an injection molding process, so as to be integral with the connecting section 23 and the connecting piece 18. The openings 22 are openings in the integral housing part. The second assembly 32 advantageously comprises further components, in particular the handle 4 shown in FIG. 1.

Figure 4:
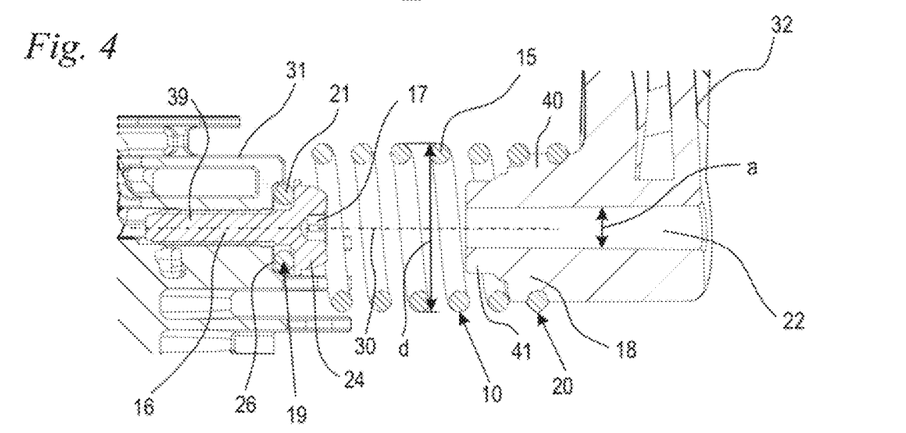
FIG. 4 is a section through an anti-vibration unit of the work apparatus from FIG. 1.

As shown by FIG. 4, a first end 19 of the coil spring 15 forms a fastening eyelet 21. The attachment screw 16 projects, with its shaft 39, through the fastening eyelet 21. The attachment screw 16 has a head 24 that, when the arrangement is in the mounted state, fixes the fastening eyelet 21 to the first assembly 31. In the embodiment, the fastening eyelet 21 is arranged in a depression 26 of the first assembly 31. The longitudinal center axis of the attachment screw 16 runs, from the first end 19 to the second end 20 of the coil spring 15, entirely within the coil spring 15. In the embodiment, the longitudinal center axis of the attachment screw 16 coincides with the longitudinal center axis 30 of the coil spring 15. The attachment screw 16 and the coil spring 15 are coaxial with each other. The longitudinal center axis of the attachment screw 16 runs through the opening 22. The engagement contour 17 is realized in the head 24 of the attachment screw 16, on the side that faces toward the connecting piece 18.

As also shown by FIG. 4, there is a corresponding connecting piece 18, for each anti-vibration unit 10, formed-on in the integral housing part. A corresponding opening 22 extends through the connecting pieces 18. The opening 22 has an inner diameter a, which is less than an outer diameter d of the coil spring 15. A second end 20 of the coil spring 15 is screwed onto the connecting piece 18. In the embodiment, the second end 20 is screwed onto the outer circumference of the connecting piece 18. It may also be provided, however, that the connecting piece 18 is of a cup-shaped configuration, and the second end 20 of the coil spring 15 is screwed onto an inner circumference of the connecting piece 18.

Figure 5:
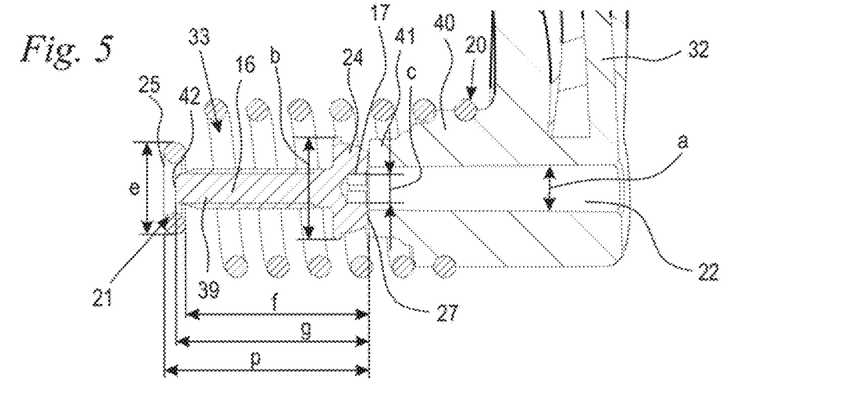
FIG. 5 is a section through an anti-vibration unit held on the second assembly.

As shown by FIG. 5, the head 24 of the attachment screw 16 has an outer diameter b. The outer diameter b is significantly greater than the inner diameter a of the opening. Consequently, the head 24 of the attachment screw 16 cannot pass through the opening 22. The attachment screw 16 cannot be inserted in the coil spring 15 through the opening 22. Accordingly, before the coil spring 15 is mounted on the connecting piece 18, the attachment screw 16 must be inserted into the coil spring 15. The attachment screw 16 can then only be actuated, through the opening 22, at the engagement contour 17, and thus mounted on the first assembly 31, but cannot fall out from the inside 33 of the coil spring 15 through the opening 22. The inside 33 of the coil spring 15 in this case is the space enclosed by the spring coils of the coil spring 15.

As also shown by FIG. 5, the fastening eyelet 21 has an outer diameter e. The outer diameter e is less than the diameter d of the coil spring 15 (FIG. 4). In the embodiment, the outer diameter b of the head 24 of the attachment screw 16 is only slightly greater than the outer diameter e of the fastening eyelet 21. The fastening eyelet 21 has a support surface 25, which is flat. In the mounted state, the support surface 25 is located in the depression 26.

As also shown by FIG. 5, the attachment screw 16 has a length g, measured parallel to the longitudinal center axis 30. When the work apparatus 1 is in the non-loaded state shown, the fastening eyelet 21 has a distance f from a front end 27 of the connecting piece 18 that is arranged inside the coil spring 15. In the embodiment, the length g is greater than the distance f. The distance f in this case is measured at the point on the fastening eyelet 21 against which the head 24 of the attachment screw 16 comes to bear. The non-loaded state of the work apparatus 1 is a state in which there are no forces acting upon the work apparatus 1 at the handles and at the saw chain 9, and expanding or compressing the vibration gap 2.

Since the distance f is less than the length g, during mounting the free end 42 of the attachment screw 16 is guided and held in the fastening eyelet 21. The end 42 of the attachment screw 16 is prevented from becoming caught between adjoining coils of the coil spring 15. The fastening eyelet 21 orients the end 42 of the attachment screw 16 in relation to the opening of the bore 35 (FIG. 6) of the first assembly 31. The bore 35 in this case is realized as a threaded bore, into which the attachment screw 16 is screwed when in the mounted state. Since the end 42 of the attachment screw 16 is oriented in relation to the bore 35, in the mounting operation the attachment screw 16 is more easily arranged on the first assembly 31. The mounting operation is thereby simplified. The engagement contour 17 has a greatest diameter c, which is less than the diameter a of the opening 22. Consequently, a tool can easily be inserted through the opening 22, for the purpose of engaging in the engagement contour 17.

Since there is always a portion of the attachment screw 16 arranged within the fastening eyelet 21, the slant of the attachment screw 16 inside the coil spring 15 is limited to an extent at which it is possible for a tool 34 (FIG. 9) to engage through the opening 22, into the engagement contour 17 of the attachment screw 16. It may be expedient to make the diameter a of the opening 22 of such a magnitude that the tool 34 (FIG. 9) can be arranged at a slant in the opening 22. The accessibility of the engagement contour 17 of an attachment screw 16 having a limited slant can thereby be improved. However, the diameter a of the opening 22 is less than the outer diameter b of the head 24 of the attachment screw 16, such that there preferably results an annular bearing contact of the head 24 against the front end 27 of the connecting piece 18.

The support surface 25 of the fastening eyelet 21 has a distance p from the front end 27 of the connecting piece 18. The distance p is greater than or equal to the length g of the attachment screw 16. Consequently, when the head 24 bears against the front end 27 of the connecting piece 18, the free end 42 of the attachment screw 16 is located in the fastening eyelet 21. In the embodiment, the distance p is greater than the length g of the attachment screw 16. The connecting piece 18 has a thread section 40 and a sleeve section 41 (see also FIG. 4). The coil spring 15 bears with its coils against the thread section 40. The axial length of the thread section 40 is matched to the desired springing properties. The sleeve section 41 extends radially within the coils of the coil spring 15, between the thread section 40 and the front end 27 of the connecting piece 18. The axial length of the sleeve section is selected in such a manner that the distance p of the support surface 25 from the front end 27 of the connecting piece 18 is greater than or equal to, and the distance f of the fastening eyelet 21 from the front end 27 is less than or equal to, the length g of the attachment screw 16. Consequently, when the attachment screw 16 is maximally tightened into the coil spring 15, the free end 42 is located within the fastening eyelet 21. Thus, when the attachment screw 16 bears with its head 24 against the front end 27 of the connecting piece 18, the end 42 of the attachment screw 16 does not project over the first end 19 of the coil spring 15. This is advantageous, in particular, if the mounting of the first assembly 31 is effected in such a manner that the longitudinal center axis 30 of the coil spring 15 is oriented in the direction of gravity, and the second assembly 32 is arranged, in particular, beneath the first assembly 31. The attachment screws 16 then automatically assume their maximally tightened position, and do not project over the first assembly 31, and cannot catch thereon when the first ends 19 of the coil springs 15 are being arranged.

As a result of the end 42 of the attachment screw 16 being pre-positioned and guided in the fastening eyelet 21, and the contour of the depression 26 (FIG. 4) being matched to the fastening eyelet 21, incorrect mounting of the first end 19 of the coil spring 15 on the first assembly 31 is largely avoided. In the event of the coil spring 15 being incorrectly arranged, it cannot be inserted in the depression 26 or, more specifically, the attachment screw 16, pre-positioned by the coil spring 15, cannot be brought to overlap with the bore 35. The attachment screw 16 can only be inserted, in particular, if it sits flatly on the fastening eyelet 21.

Since the connecting piece 18, in addition to the thread section 40, has a sleeve section 41, the lengths of the sleeve section 41 and of the thread section 40 can be adapted, independently of each other, to the length g of the attachment screw 16 and to the desired characteristic of the coil spring 15.

Figure 6:
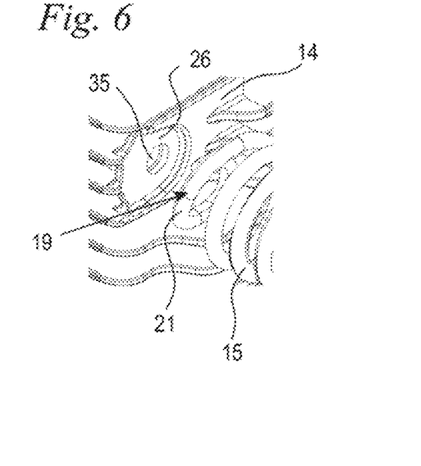
FIG. 6 is a perspective detail view of the region of the first end of the anti-vibration unit, in an exploded view.

FIG. 6 shows the first end 19 of a coil spring 15, which is fixed to the cylinder 14. As shown by FIG. 6, the cylinder 14 has the depression 26. There is a threaded bore 35 arranged in the depression 26. The attachment screw 16 can be screwed into the threaded bore 35 for the purpose of fastening the coil spring 15 to the cylinder 14.

Figure 7:
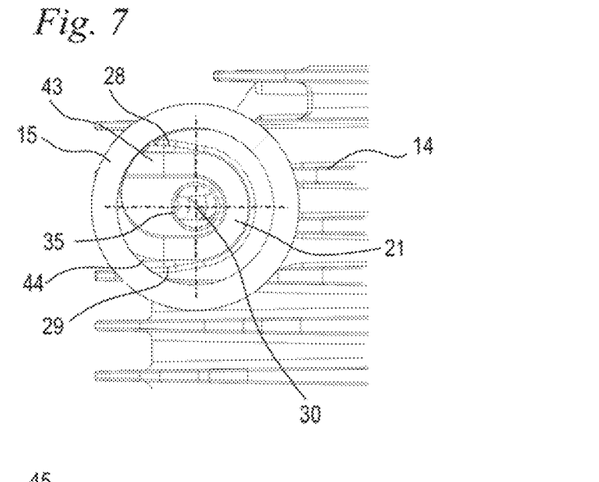
FIG. 7 is a view of the coil spring on the cylinder of the first assembly.

As shown by FIG. 7, the depression 26 has walls 28 and 29, which are arranged on opposite legs 43, 44 of the fastening eyelet 21. Depending on the direction of coil of the attachment screw 16, the fastening eyelet 21 is supported with its one leg 43 or its other leg 44 on one wall 28 or the other wall 29. Advantageously, the walls 28 and 29 have a slight angular offset in relation to the legs 43, 44 of the fastening eyelet 21. The angular offset serves to compensate tolerances in the orientation of the fastening eyelet 21. The angular offset, that is, the angle that the legs 43, 44 enclose with the walls 28, 29, is advantageously between 5° and 15° at each wall. In the position shown in FIG. 7, the legs 43 and 44 of the fastening eyelet 21 have small distances from the two walls 28 and 29.

Figure 8:
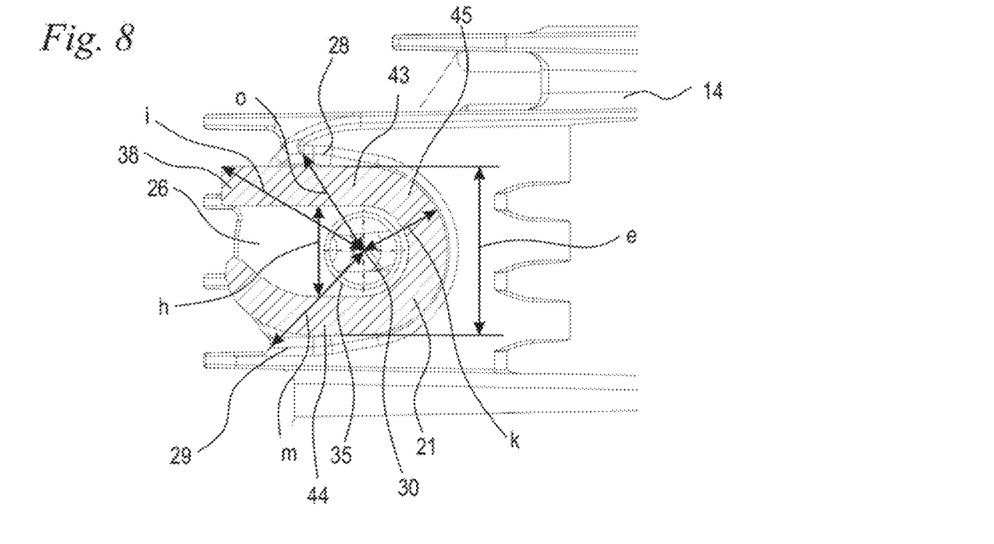
FIG. 8 is a section through the arrangement from FIG. 7, in the region of the fastening eyelet; and, FIG. 9 is an exploded view of the anti-vibration unit between a cylinder and a first assembly.

As shown by FIG. 8, the fastening eyelet 21 does not extend over its entire length in the form of a circular arc around the longitudinal center axis 30. The fastening eyelet 21 has an arc section 45, in which it extends around the longitudinal center axis 30, and has the legs 43 and 44, which adjoin the arc section and which are approximately tangential to the longitudinal center axis 30. The walls 28, 29 of the depression 26 follow the contour of the fastening eyelet 21 in the region of the arc section, and in the region of the legs 43, 44 have an angular offset in relation to the walls 28, 29.

Toward a free end 38 of the coil spring 15, the distance of the coil wire, at the fastening eyelet 21, from the longitudinal center axis 30 increases. In the arc section 45 of the fastening eyelet 21, the coil wire has a least distance k from the longitudinal center axis. Toward the free end 38, the distance increases to a greatest distance i. The wall 29 has a distance m from the longitudinal center axis that is greater than the least distance k, but significantly less than the distance i. The wall 28 has a distance o from the longitudinal center axis that is less than half of the diameter d of the coil spring 15. Consequently, the fastening eyelet 21 cannot rotate arbitrarily in the depression 26, but only until the coil wire stops against the wall 28 or against the wall 29.

The fastening eyelet 21 has a least inner diameter h. The least inner diameter h is greater than an outer diameter n of a shaft 39 of the attachment screw 16 (FIG. 9).

Figure 9:
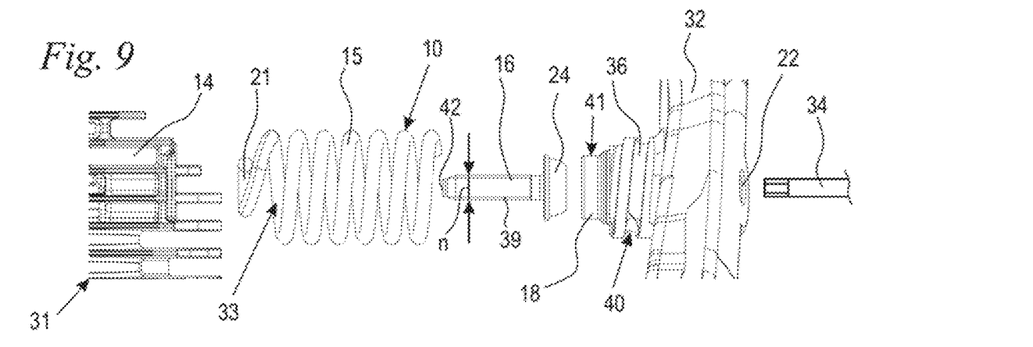

Shown schematically in FIG. 9 are the individual parts of the anti-vibration unit 10, by means of which the first assembly 31 and the second assembly 32 are connected to each other. As individual parts, the anti-vibration unit 10 has only the coil spring 15 and the attachment screw 16. The connecting piece 18 of the anti-vibration unit 10 is integrally formed onto the second assembly 32. In the thread section 40, at its outer circumference, the connecting piece 18 has a groove 36, which is realized in the form of a helix and into which the coil spring 15 can be screwed.

For the purpose of mounting the anti-vibration unit 10, the attachment screw 16 is first arranged on the inside 33 of the coil spring 15, specifically such that the shaft 39 projects through the fastening eyelet 21. The coil spring 15 is then screwed into the groove 36 of the connecting piece 18. Since both the inner diameter h of the fastening eyelet 21 and the inner diameter a of the opening 22 are less than the outer diameter b of the head 24 of the attachment screw 16, the attachment screw 16 is thereby held in a captive manner on the second assembly 32. Since the distance f is less than the length g (see FIG. 5), the shaft 39 cannot disengage from the fastening eyelet 21, such that the attachment screw 16 is in the correct position for mounting on the first assembly 31, for example on the cylinder 14 or on the engine mount 37. Since the attachment screw 16 and the coil spring 15 are held on the second assembly 32, further mounting steps, not associated with the anti-vibration units, can be performed.

In a subsequent mounting step, the two assemblies 31 and 32 are connected to each other. For this purpose, the fastening eyelet 21 is arranged in the depression 26 of the cylinder 14, and the attachment screw 16 is screwed into the bore 35 of the first assembly 31. Provided for this purpose is a tool 34, which is represented schematically in FIG. 9, and which may be, for example, a screwdriver. The tool 34 is dimensioned such that it can be inserted, through the opening 22, into the engagement contour 17. Since the slant of the attachment screw 16 within the coil spring 15 is limited by the fastening eyelet 21, at least a portion of the engagement contour 17 always overlaps with the opening 22 and is accessible for a tool 34.

It is provided, in particular, that at least two, advantageously all, anti-vibration units 10 are pre-mounted on the same assembly 31, 32, in particular on the same housing part. In this way, upon connection of the two assemblies 31, 32, all first ends 19 of the coil springs 15 come into contact "simultaneously" with the associated depressions 26 of the other assembly 31, such that all attachment screws 16 can be fastened in succession or simultaneously in one work operation.

Since all openings 22 are open toward the same longitudinal side of the work apparatus 1 (FIG. 3), the attachment screws 16 of all anti-vibration units 10 can be mounted from the same side of the work apparatus 1, and mounted in the same direction on the first assembly 31. The mounting operation is thereby simplified.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising: a first assembly defining a support surface; a second assembly defining a support stub; and, at least one anti-vibration unit;
   said anti-vibration unit including:
   a coil spring defining an interior and having first and second ends;
   said first end of said coil spring defining a fastening eyelet whereat said coil spring has a reduced outer diameter (e);
   an attachment screw attaching said first end of said coil spring to said first assembly;
   said attachment screw extending through said fastening eyelet and having a head projecting into said interior of said coil spring;
   said fastening eyelet defining a support surface bearing against said support surface of said first assembly;
   said second end of said coil spring threadably engaging said support stub of said second assembly;
   said support stub extending into said interior of said coil spring and having an end face arranged in said interior;
   said head of said attachment screw defining an engagement contour;

said second assembly having an opening formed therein extending through said support stub with said opening being configured to allow access with a work tool to said engagement contour of said head of said attachment screw;

said fastening eyelet and said end face of said support stub conjointly defining a first distance (f) therebetween;

said attachment screw having a length (g);

said support surface of said fastening eyelet and said end face of said support stub conjointly defining a second distance (p) therebetween; and, in an unloaded state of said work apparatus, said first distance (f) being equal to or less than said length (g) and said second distance (p) being equal to or greater than said length (g).

2. The handheld work apparatus of claim 1, wherein said head of said attachment screw has an outer diameter (b); and, said opening has an inner diameter (a) which is at most 110% of said outer diameter (b) of said head of said attachment screw.

3. The handheld work apparatus of claim 1, wherein one of said first and second assemblies has at least one handle; and, the other one of said first and second assemblies has a drive motor.

4. The handheld work apparatus of claim 1, wherein said support stub is formed integrally with a housing part of said second assembly.

5. The handheld work apparatus of claim 4, wherein said housing part defines at least one handle.

6. The handheld work apparatus of claim 1, wherein said coil spring defines a longitudinal center axis; and, said first assembly has an anti-rotation safeguard for securing said fastening eyelet against a rotation about said longitudinal center axis of said coil spring.

7. The handheld work apparatus of claim 1, wherein said coil spring defines a longitudinal center axis; said fastening eyelet has a non-round outer contour; and, said first assembly secures said fastening eyelet on said non-round outer contour against a rotation about said longitudinal center axis of said coil spring.

8. The handheld work apparatus of claim 1, wherein said first assembly has a depression; and, said fastening eyelet is arranged at least partially in said depression.

9. The handheld work apparatus of claim 8, wherein said coil spring defines a longitudinal center axis; said first assembly has a wall delimiting said depression; and, said wall defines an anti-rotation safeguard for said fastening eyelet against a rotation about said longitudinal center axis.

10. The handheld work apparatus of claim 1, wherein said fastening eyelet has an inner diameter (h) and said head of said attachment screw has an outer diameter (b); and, said inner diameter (h) is less than said outer diameter (b).

11. The handheld work apparatus of claim 1, wherein said attachment screw defines a longitudinal center axis running between said first end and said second end of said coil spring in said interior of said coil spring.

12. The handheld work apparatus of claim 1, wherein said anti-vibration unit is a first anti-vibration unit and said work apparatus further comprises a second anti-vibration unit likewise including a coil spring and a support stub; said support stub of said first anti-vibration unit and said support stub of said second anti-vibration unit are both arranged on said second assembly; said coil spring of said second anti-vibration unit has a second end threadably engaged on the support stub corresponding thereto; said second anti-vibration unit likewise has an attachment screw having a head defining an engagement contour; and, said engagement contours of corresponding ones of said attachment screws are accessible from a common side of said work apparatus.

13. A method for assembling an anti-vibration unit of a handheld work apparatus which includes first and second assemblies;

the anti-vibration unit including:

a coil spring defining an interior and having first and second ends;

said first end of said coil spring defining a fastening eyelet whereat said coil spring has a reduced outer diameter (e);

an attachment screw attaching said first end of said coil spring to said first assembly;

said attachment screw extending through said fastening eyelet and having a head projecting into said interior of said coil spring;

said fastening eyelet defining a support surface bearing against said support surface of said first assembly;

said second end of said coil spring threadably engaging said support stub of said second assembly;

said support stub extending into said interior of said coil spring and having an end face arranged in said interior;

said head of said attachment screw defining an engagement contour;

said second assembly having an opening formed therein extending through said support stub with said opening being configured to allow access with a work tool to said engagement contour of said head of said attachment screw;

said fastening eyelet and said end face of said support stub conjointly defining a first distance (f) therebetween;

said attachment screw having a length (g);

said support surface of said fastening eyelet and said end face of said support stub conjointly defining a second distance (p) therebetween; and, in an unloaded state of said work apparatus, said first distance (f) being equal to or less than said length (g) and said second distance (p) being equal to or greater than said length (g); and, the method comprising the steps of:

arranging said head of said attachment screw in said coil spring;

threadably engaging said second coil spring with said second end thereof on said support stub; and, screwing said attachment screw into said first assembly.

* * * * *

UNITED STATES PATENT AND TRADEMARK OFFICE
CERTIFICATE OF CORRECTION

| | | |
|---|---|---|
| PATENT NO. | : 10,807,225 B2 | Page 1 of 1 |
| APPLICATION NO. | : 16/513347 | |
| DATED | : October 20, 2020 | |
| INVENTOR(S) | : Carsten Freymueller | |

It is certified that error appears in the above-identified patent and that said Letters Patent is hereby corrected as shown below:

On the Title Page

Under (57) ABSTRACT, Line 13: delete "$\leq$the" and insert -- $\leq$ the --.

Under (57) ABSTRACT, Line 15: insert -- $\geq$ -- after "is".

Signed and Sealed this
Twenty-second Day of December, 2020

Andrei Iancu
*Director of the United States Patent and Trademark Office*